United States Patent
Kozlov

[15] 3,668,400
[45] June 6, 1972

[54] NUCLEAR RADIATION DETECTION DEVICE UTILIZING DIAMOND DETECTOR WITH INJECTING AND BLOCKING CONTACTS

[72] Inventor: Stanislav Fedorovich Kozlov, B. Akademicheskaya ulitsa, 49, korpus I, kv. 18, Moscow, U.S.S.R.

[22] Filed: Sept. 10, 1969

[21] Appl. No.: 856,606

[30] Foreign Application Priority Data

Sept. 11, 1968 U.S.S.R..................1269669

[52] U.S. Cl........................250/83.3 R, 250/83 R
[51] Int. Cl..................................G01t 1/24
[58] Field of Search.....................250/83, 83.3 R

[56] References Cited

UNITED STATES PATENTS

| 2,678,400 | 5/1954 | McKay | 250/83.3 X |
| 2,694,112 | 11/1954 | McKay | 250/83.3 X |
| 2,760,078 | 8/1956 | Youmans | 250/83.3 |
| 2,806,145 | 9/1957 | Cotty | 250/83.3 |

Primary Examiner—Archie R. Borchelt
Attorney—Waters, Roditi, Schwartz & Nissen

[57] ABSTRACT

A device for detecting nuclear radiations, comprising a nuclear radiation detector on the basis of a diamond crystal plate, having a blocking and an injecting contacts, a detector power supply associated with the injecting contact, and an amplifier with recording means associated with the blocking contact.

1 Claim, 2 Drawing Figures

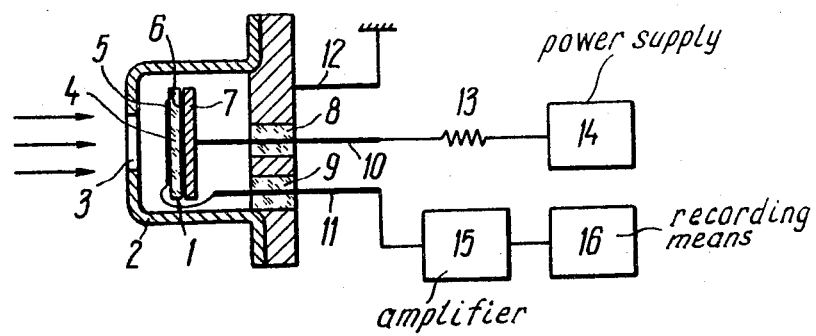

NUCLEAR RADIATION DETECTION DEVICE UTILIZING DIAMOND DETECTOR WITH INJECTING AND BLOCKING CONTACTS

The present invention relates to the devices for nuclear radiation detection, comprising a diamond detector as an element sensitive to nuclear radiation.

In modern practice devices are widely used for detecting nuclear radiations, comprising as a radiation sensitive element germanium or silicon detectors with two contacts. Such devices also contain a detector power supply and an amplifier with recording means. One of the detector contacts is usually grounded, while the opposite contact associated with the power supply is used for removing the detector signals arising from bombardment with nuclear radiation. For this purpose it is connected through a blocking capacitor to the amplifier with the recording means.

A limitation of such devices is that it is necessary to use guard rings and blocking capacitors at the amplifier input, since the detector has leakage currents. This increases the device input capacitance and hence results in decreasing the input signal and the sensitivity of the device as a whole. In addition, the devices described above cannot operate reliably and efficiently at elevated temperatures owing to a high noise level of the detector.

Attempts have been made with a view to developing a device for nuclear radiation detection, comprising a diamond crystal as a detector. However, such devices have not found practical application, since the previously known diamond detectors had poor counting and spectrometric properties and polarized under prolonged irradiation.

We have proposed a new detector on the basis of a diamond crystal plate (see our application Ser. No. 716,953). Compared with the known diamond detectors, the counting and spectrometric properties of this detector are much better. Although this detector used in the device for nuclear radiation detection may be associated with the power supply and the amplifier in the usual fashion, the known connection circuit does not allow, however, all its capabilities to be fully realized.

It is an object of the present invention to increase the sensitivity and reliability of the device designed for detection of nuclear radiation.

In the accomplishment of said and other objects of the invention, in a device for detecting nuclear radiations, comprising a nuclear radiation detector with an amplifier and means for recording output signals and a power supply, according to the invention, a detector is essentially a diamond crystal plate with contacts formed at the opposite sides thereof, having the thickness of the operating range between said contacts not exceeding the distance travelled by charge carriers in the diamond crystal under the influence of an applied electric field, the contact disposed on the plate side adapted to be irradiated being made blocking in relation to charge carriers and connected to the input of an amplifier with recording means, while the opposite contact disposed on the plate side not adapted to be irradiated is made of a material capable, in conjunction with a diamond, of injecting charge carriers under the influence of an applied electric field and connected through a resistor to a power supply.

Under operation the signal voltage at the amplifier input is given by $U = Q/\Sigma C$ where $Q$ is the electrical charge collected into the detector contacts and $\Sigma C$ is the total input capacitance to earth, equal to $$\Sigma C = Cd + Cs + Ca$$

Here $Cd$ is the detector capacitance, $Cs$ is the stray capacitance and $Ca$ is the amplifier input capacitance. The diamond detector capacitance $Cd$ is small and stable. The diamond detector leakage currents are negligible owing to high resistivity and high forbidden energy gap of the diamond. Thus the blocking contact of the diamond detector may be directly connected to the amplifier input without increasing the noise level, so as to minimize the stray capacitance $Cs$. The amplifier input stage may be designed to have the low input capacitance $Ca$, by using for instance a cathode follower. For these reasons, the proposed device connection circuit allows the total input capacitance $\Sigma C$ to be considerably reduced. This provides for obtaining a large signal and a high signal to noise ratio and increases the device sensitivity and counting efficiency.

For a better understanding of the invention presented hereinbelow is a description of an exemplary embodiment thereof with reference to the accompanying drawing, in which a schematic of the device for detecting nuclear radiations is shown in accordance with the invention.

A nuclear radiation detector I is mounted in a metal housing 2 having a window opening 3. The detector I is essentially a diamond crystal plate 4, on whose opposite sides contacts 5 and 6 are provided. The detector I is arranged so that the contact 5 faces the window opening 3 through which nuclear radiation under investigation falls on the detector I. The contact 5 is made blocking in relation to charge carriers, for example in the form of a gold film. The contact 6 disposed on the opposite side of the plate 4 is made of a material capable, in conjunction with a diamond, of injecting charge carriers under the influence of an applied electric field. For instance this contact may be formed by doping the surface layer of the diamond crystal plate with boron. The thickness $d$ of the operating range of said plate 4 between the contacts 5 and 6 does not exceed the distance travelled by charge carriers in the diamond crystal under the influence of an applied electric field and is given by $$d \leq \delta = \eta \tau E$$

where $\eta$ is the mobility of charge carriers (electrons or holes), $\tau$ is the lifetime of charge carriers, $E$ is the applied field strength, $\delta$ is the distance travelled by charge carriers under the influence of the applied electric field.

The detector I is fixed on a support 7 for instance by means of silver paint (paste) subjected to appropriate treatment. The support 7 made from an electroconductive material is disposed on the side of the injecting contact 6. The housing 2 has insulators 8 and 9. Metal leads 10 and 11 extend through these insulators. A metal lead 12 is used for grounding the housing 2. The lead 10 welded to the support 7 is associated through a resistor 13 with a power supply 14. The lead 11 joined to the blocking contact 5 is connected by a short wire to the input of an amplifier 15 with recording means 16.

The device described hereinabove operates in the following manner. A direct voltage is applied to the diamond detector I with the aid of the power supply 14. Nuclear radiation passes through the window opening 3 in the housing 2, penetrates the diamond detector I from the side of the blocking contact 5 and causes ionization inside the detector. The resulting charge carriers (electrons and holes) move to the contacts 5 and 6 under the influence of the applied electric field. The electrons travel to the injecting contact 6, if the positive potential is applied to it. The holes travel to the blocking contact 5. On their movement to the contact 6 some electrons are trapped by traps always present in the diamond crystal. As a result, the diamond crystal plate 4 polarizes. The injecting contact 6 is designed to remove said polarization. Since deep traps are present in the diamond, the injection currents from the contact 6 are limited by the space charge accumulated by these traps. Thus, the injection currents do not induce significant conductivity and, consequently, noise. However, when field and charge equilibrium inside the diamond crystal plate is disturbed due to polarization created by incident nuclear radiation, the charge carriers (holes) injected by the contact 6 restore the initial steady state of the crystal.

Some holes travelling to the contact 5 may also be trapped. In this case, however, the trapped holes are in the ionization zone and can be neutralized by the charge carriers of the opposite sign, i.e. by electrons. In addition, when detecting heavily ionizing nuclear radiation, losses in the electron-hole plasma are reduced, since the field strength is higher in the vicinity of the blocking contact 5.

The signal removed from the blocking contact 5 of the diamond detector I is fed to the input of the amplifier 15 and then to the recording means 16, such as a pulse-height analyser.

The diamond detector can also be enclosed in a non-metal housing made, for example, from ceramics or plastics. If the housing is made from ceramics, it is possible to elevate the upper limit of allowable operating temperatures. If the housing is made from plastics or metals having a low atomic number, such as aluminum, the device has reduced sensitivity to gamma-radiation background. The diamond detector may also be encapsulated in epoxy resins, silicone resins or compounds.

With a view to increasing the detecting area, a mosaic is composed of the diamond detectors with the blocking and injecting contacts.

For long-range radiation spectrometry the diamond detectors may be stacked together, the stack thickness exceeding the range of incident nuclear radiation.

The present device for detecting nuclear radiations has a number of advantages over known devices. It allows different types of radiations having various energies to be detected with high sensitivity and reliability, posseses good counting and spectrometric properties and operates at room and higher temperatures with a high signal to noise ratio. Since the diamond detector withstands heating up to high temperatures, the defects caused by nuclear radiations may be annealed from time to time. This increases radiation resistance of the device.

We claim:

1. A device for detecting nuclear radiations, comprising in combination a nuclear radiation diamond detector, said detector being essentially a diamond crystal plate having contacts disposed at the opposite sides thereof, said plate having a thickness equal to or less than the maximal drift length of charge carriers in the diamond crystal under the influence of an applied electric field, the contact disposed on the plate side subjected to radiation being made blocking in relation to charge carriers, the opposite contact disposed on the plate side not subjected to radiation being made of a material capable, in conjunction with the diamond, of injecting charge carriers under the influence of said applied electric field; a power supply connected to said injecting contact; an amplifier connected to said blocking contact; and means for recording generated output signals from said amplifier.

* * * * *